United States Patent [19]

Nakane et al.

[11] Patent Number: 5,086,345
[45] Date of Patent: Feb. 4, 1992

[54] METHOD OF OPERATION IN A STILL VIDEO CAMERA SYSTEM FOR TRANSFERRING TRACK INFORMATION FROM A PLAYBACK DEVICE TO THE STILL VIDEO CAMERA

[75] Inventors: Yoshio Nakane; Kiyotaka Kaneko; Izumi Miyake; Yutaka Maeda; Hiroshi Shimaya, all of Tokyo, Japan

[73] Assignee: Fuji Photo Film Co., Ltd., Kanagawa, Japan

[21] Appl. No.: 334,564

[22] Filed: Apr. 7, 1989

[30] Foreign Application Priority Data

Apr. 7, 1988 [JP] Japan .................................. 63-84082
Apr. 7, 1988 [JP] Japan .................................. 63-84083

[51] Int. Cl.$^5$ ........................ H04N 5/76; H04N 5/225
[52] U.S. Cl. ..................................... 358/335; 358/906; 358/909
[58] Field of Search ............... 358/906, 909, 310, 335, 358/342; 360/72.2, 33.1, 35.1

[56] References Cited

U.S. PATENT DOCUMENTS

| 4,224,506 | 9/1980 | Coppola et al. ........................ 344/26 |
| 4,325,080 | 4/1982 | Satoh ..................................... 358/906 |
| 4,660,102 | 4/1987 | Kawakami et al. .................. 358/906 |
| 4,691,253 | 9/1987 | Silver ................................... 358/312 |
| 4,802,018 | 1/1989 | Tanikawa et al. .................... 358/906 |

FOREIGN PATENT DOCUMENTS 0204626 10/1986 European Pat. Off. ............ 358/906

Primary Examiner—Roy N. Envall, Jr.
Assistant Examiner—Thai Tran

[57] ABSTRACT

In a system including a still video camera and a playback device capable of being connected thereto, the playback device stored track information (such as data representing the field/frame recording and the envelope peak position) detected in a playback operation in a memory thereof corresponding to a track number. When the power of the playback device or the like is turned off, the track information is transferred from the playback device to the camera side and is stored in a memory of the camera side. When the playback device achieves thereafter a playback operation, the track information is again transferred to the playback device so as to be used for the playback operation. The track information can also be used in an erase operation on the camera side or in the playback device. In addition, track information used in a recording operation of the camera is stored in a memory thereof corresponding to a track member. When the playback device is connected to the camera and a mode thereof is changed over to a playback mode, the track information is transferred from the camera to the playback device, thereby storing the track information in a memory of the playback device. The track information is used when the playback device conducts a playback operation.

6 Claims, 5 Drawing Sheets

Fig.2

| TRACK NO. | PRESENCE/ ABSENCE OF RECORDING | PLAYBACK ALREADY EFFECTED? | FIELD/FRAME DATA | PEAK POSITION |
|---|---|---|---|---|
| | | | | |

Fig.4

| TRACK NO. | PRESENCE/ ABSENCE OF RECORDING | FIELD/FRAME DATA |
|---|---|---|
| | | |

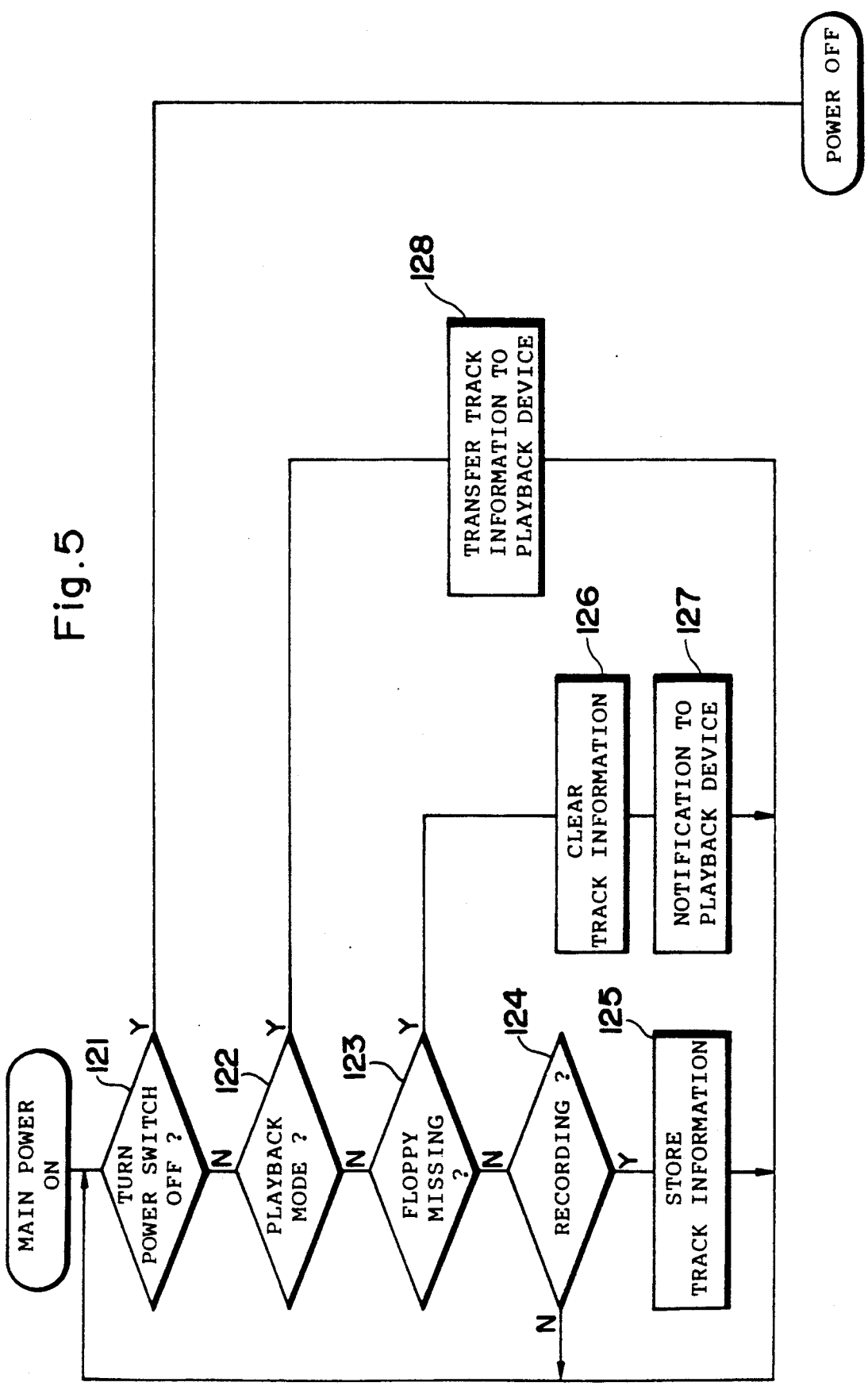

METHOD OF OPERATION IN A STILL VIDEO CAMERA SYSTEM FOR TRANSFERRING TRACK INFORMATION FROM A PLAYBACK DEVICE TO THE STILL VIDEO CAMERA

BACKGROUND OF THE INVENTION

The present invention relates to a method of operation in a still video camera system comprising a still video camera in which a still video signal representing an objective image produced by means of a solid-state imaging element is recorded on a predetermined track or in two predetermined tracks of a rotating magnetic recording medium having a plurality of tracks and a playback device or apparatus capable of being connected to the still video camera for reproducing a signal read from the predetermined track or the two predetermined tracks. In particular, the present invention relates to a method of operation to effect a backup operation of track information detected by the playback device and to a method of operation to use for a playback operation of the playback device for the track information employed in a recording operation of the camera.

A still video signal attained through a shooting operation by use of a still video camera undergoes a frequency modulation (FM) so as to be recorded on a predetermined track or on two predetermined tracks of a magnetic recording medium. In a field recording mode, still video signals representing a frame of an image are recorded on a track. Whereas, in a frame recording mode, the still video signals are recorded on two tracks. On the magnetic recording medium, data called ID data is duplicatedly recorded. The ID data includes data items such as a data item indicating the field recording or the frame recording mode and a track number (No).

When the playback device reads for a playback processing the still video signal recorded on the magnetic recording medium, the ID data duplicatedly recorded thereon is first read out so as to be demodulated such that the field image or the frame image is determined depending on the attained data, thereby controlling the playback processing of the video signals. The operations to read and to demodulate the ID data are accomplished for each playback operation of a still picture.

For a picture previously reproduced, the ID data demodulated in the playback operation may be saved for the subsequent playback processing, which enables the playback processing speed to be increased.

Alternatively, since the ID data is known when a still video signal is recorded in the camera, this ID data may be supplied to the playback device, so that the playback processing is effected at a high speed by use of the supplied ID data without demodulating the ID data in the playback device.

SUMMARY OF THE INVENTION

It is therefore an object of the present invention to provide a method of operation in which for a reproduced image of a track, ID data and the like obtained when the image is reproduced are saved so as to utilize the saved data in a playback operation of the image on the same track. In particular, an object of the present invention is to provide a method of operation in a still video camera system comprising a still video camera and a playback device capable of being connected thereto in which the reproduced ID data and the like can be saved.

The size and weight of a still video camera is desirably set to be as small as possible. However, a playback device is necessary to provide the camera with a playback function. To satisfy these requirements, it is desirable that the playback device is separated from the camera and that the playback device can be electrically connected thereto (or, can be detachably installed in the camera in some cases).

The present invention is applied to a still video camera system comprising such a still video camera and a playback device capable of being connected thereto.

The method of operation according to the present invention is characterized in that the playback device stores in a memory thereof track information detected in association with a playback processing such that the track information corresponds to a track number and that in a power off operation of either one of the still video camera and the playback device, the track information stored in the memory of the playback device is transferred from the playback device to the still video camera so as to be stored in a memory of the still video camera. The track information contains at least a field/frame data item representing the field recording or the frame recording.

According to the present invention, when the playback device or the like undergoes a power off operation (including one effected by an automatic power off operation), the track information detected by the playback device is transferred to the still video camera, which in turn stores the information in the memory thereof. In consequence, thereafter, when the power of the playback device is turned on to effect again the playback operation, so far as the magnetic recording medium is not beforehand replaced, if the track information saved on the side of the camera is received, it is possible to use the previous track information for the picture reproduced before. That is, the playback device need not achieve an operation to detect the track information and hence can effect the playback operation on the track at a high speed. In addition, when an erase operation is conducted on the side of the camera or the playback apparatus, the track information is also utilized, which consequently enables the erase operation of the image previously reproduced to be conducted at a high speed.

Another object of the present invention is to provide a method of operation in a video still camera system including a still video camera and a playback device capable of being connected thereto in which ID data employed in a recording operation on the side of the camera is supplied to the playback device when the playback device is connected to the camera. As a result, the speed of the playback operation thereof is increased.

The method of operation according to the present invention is characterized in that the still video camera stores in a memory thereof track information used in a recording operation of the camera and that when the playback device is connected thereto and the operation is changed over to the playback mode, the track information stored in the memory of the still video camera is transferred to the playback device, which in turn stores the information in a memory thereof. The track information contains at least a field/frame data item representing the field recording or the frame recording.

According to the present invention, the still video camera stores in a memory of the side thereof track information used in a recording operation, and when the playback device is connected thereto and the operation is changed over to the playback mode, the track information is supplied to the playback device. In consequence, in the playback device, without effecting an operation to detect the track information, a playback operation can be accomplished at a high speed by use of the track information thus supplied from the camera thereto. In addition, when an erase operation is conducted on the side of the camera or the playback apparatus, the track information is also utilized, which consequently enables the erase operation of the image previously reproduced to be conducted at a high speed.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 2 is a schematic diagram showing an example of a table produced in a track information table generate processing in a playback device;

FIG. 4 is a schematic diagram showing an example of a table produced in a track information table generate processing in a camera; and FIG. 5 is a flowchart showing a procedure of the table generate processing.

DESCRIPTION OF THE PREFERRED EMBODIMENT

Figure 1:
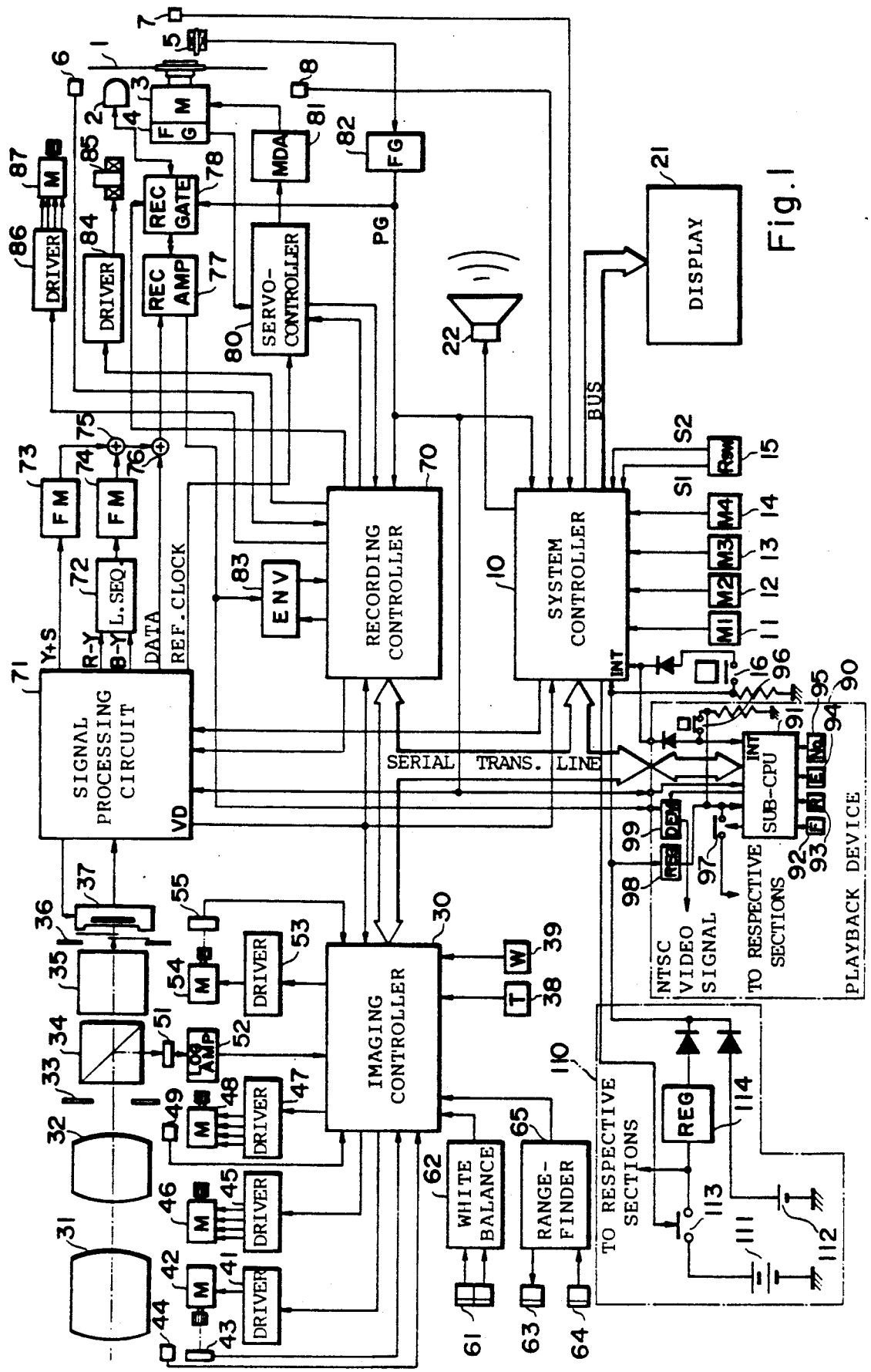
FIG. 1 is a block diagram schematically showing a system configuration of a still video camera.

FIG. 1 shows a system configuration of a still video camera.

The still video camera is controlled by three controllers, namely, a system controller 10, an imaging controller 30, and a recording controller 70. Each of these controllers 10, 30, and 70 includes a central processing unit, a CPU (e.g. a microprocessor), memories (an RAM, an ROM, etc.) storing a program to be executed by the CPU as well as necessary data, and required interface circuits. The CPU of the system controller 10 is a main CPU to control the overall operation of the still video camera. The CPUs respectively of the imaging controller 30 and the recording controller 70 are subordinate CPUs, which operate in accordance with commands from the main CPU. The imaging controller 30 performs a control operation related to such photographic functions as focusing, f-stop, shutter speed, and zoom. The recording controller 70 effects a control operation associated with driving of a disk motor 3, loading/unloading of a magnetic head 2, feeding of the magnetic head 2, and recording of still video signals on a video floppy disk (magnetic disk) 1. The controllers 10, 30, and 70 are interconnected by a serial transmission line and communicate with each other at a predetermined timing.

A playback device (playback adapter) 90 can also be connected. The playback device 90 demodulates a still video signal read out of the video floppy 1, converts the signal into, for example, a color still video signal in the NTSC format, and outputs the converted signal. The playback device 90 also includes a CPU 91 and a memory, the CPU 91 being positioned as a subordinate CPU with respect to the main CPU.

A still video camera is provided with a bucket which can be freely opened and closed. The video floppy 1 is inserted into the opened bucket. When the bucket is subsequently closed, the video floppy 1 is chucked onto the spindle of the disk motor 3.

The video floppy 1 is provided with a plurality (e.g. 50) of concentric, circular tracks (where the track pitch is 100 $\mu$m, for example). By imaging processing, one field or frame (a scene) of a frequency-modulated color still video signal (including a luminance signal and color difference signal, etc.) is magnetically recorded on one or two tracks. The 50 concentric, circular tracks provided on the magnetic recording surface of the floppy disk 1 are numbered consecutively from No. 1 to 50 from the outer side to the inner side thereof. A home position HP (an origin position or standby position) is located on the outer side of Track No. 1, and an end position EP is situated on the inner side of Track No. 50.

Applied as inputs to the system controller 10 are switch input signals from a power supply switch 16, various mode switches 11-14, and a shutter release button 15, detection signals from a bucket switch 7 which detect whether the bucket for accommodating the video floppy 1 is opened or closed (and, if necessary, whether or not the video floppy 1 is present within the bucket), and a detection signal from a condensation sensor 8 which measures the humidity near the location at which the video floppy 1 is loaded. Modes which can be set include a frame/field mode indicative of frame recording or field recording, a skip mode for providing the video floppy with blank tracks on which a recording is not made, and an edit mode for performing recording on the blank tracks. The set modes, the track numbers which are to be recorded on or to be erased, and other information are displayed on a liquid crystal display device 21. The display device 21 is connected to the system controller 10 by a bus. When condensation or some other abnormality occurs, a buzzer 22 is sounded. It is also permissible for the display device 21 to display the fact that condensation has been detected.

The power supply switch 16 is of a push-button type and when this switch 16 is depressed, a pulsated switch signal is supplied as an interruption signal to the main CPU of the system controller 10.

The shutter release button 15 is of the two-stage stroke type. A switch S1 is closed by pressing the button 15 over the first stage of its stroke, and a switch S2 is closed by depressing the button 15 over the second stage of its stroke. The disk motor 3 is driven into operation when the switch S1 is closed, and both imaging and recording are performed when the switch S2 is closed.

The imaging optical system is composed of a zoom lens system 31, an imaging lens system 32 for forming the image of a subject, a diaphragm 33, a beam splitter 34 for deflecting part of an incident light beam so that this part of the beam will impinge upon a photometric element 51, an infrared shielding filter 35, and a shutter 36. An illumination detection signal from the photometric element 51 is inputted to the imaging controller 30 via a logarithmic amplifier 52. The imaging controller 30 is operative to perform processing for calculating an f-stop value and a shutter speed based on the intensity of illumination of the incident light detected by the photometric element, controls the diaphragm 33 based on the f-stop value decided, and controls the opening and closing of the shutter 36 based on the shutter speed decided. The opening and closing of the diaphragm 33 is carried out by a diaphragm motor 48 driven by a driver 47.

Also provided is a switch 49 for detecting opening and closing limit positions of the diaphragm 33. Latch release of the front and rear curtains of the shutter 36 and wind-up thereof are executed by a shutter drive unit which includes a shutter motor 54 driven by a driver 53. The angle of rotation of the motor 54 is detected by a rotary encoder 55 and is fed back to the controller 30.

A color detection signal from a color sensor 61 is fed into the controller 30 after being subjected to predetermined processing by a white-balance processing circuit 62. The white-balance data is used to control the amplification gain of R, G, and B signals in a variable-gain amplifier circuit, which will be described below, of a signal processing circuit 71.

To measure the range to the subject, an infrared light-emitting diode 63 and a light-receiving element 64 for receiving the reflected light are provided. Data indicating the range to the subject is obtained by a range finding circuit 65 based on the output signal from the light-receiving element 64. An auto-focusing motor 46 is driven via a drive 45 under control of the controller 30 utilizing the range data, whereby focusing control is performed.

In response to signals from a telephoto switch 38 and a wide-angle switch 39 which are for inputting the degree of zoom, a motor 42 is driven by the controller 30 via a driver 41 to set a prescribed zoom magnification. The angle of rotation of the motor 42 is detected by a rotary encoder 43 and is fed back to the controller 30.

Disposed in the focal plane of the imaging optical system is a solid-state electronic image pick-up device 37 for the three primary colors, including a two-dimensional image pick-up cell array such as CCDs. Image data stored in the image pick-up device 37 when the shutter 36 opens is read out as a serial still video signal (R, G, B) in synchronization with vertical and horizontal synchronizing signals provided by a signal processing circuit 71. This serial signal is fed into the signal processing circuit 71.

The signal processing circuit 71 includes an oscillator circuit from the output signal of which a vertical reference signal VD and a reference clock signal are formed and are then outputted. The vertical reference signal VD is applied to the system controller 10, the imaging controller 30, and the recording controller 70 to serve as a reference for the operation timing of each of these devices. The reference clock signal is applied to a servo-control circuit 80. As will be described below, a phase pulse PG which represents the reference phase of rotation of the video floppy 1 is applied to the signal processing circuit 71, the system controller 10, the recording controller 70, and the playback device 90. In response to a reset signal from the recording controller 70, the signal processing circuit 71 adjusts the vertical reference signal VD in such a manner that it will maintain a constant phase relation with regard to the phase pulse PG. In addition, the signal processing circuit 71 generates the vertical and horizontal synchronizing signals, which possess a constant phase relation with regard to the phase pulse PG.

Furthermore, the signal processing circuit 71 is equipped with a preamplifier circuit to which the still video signal (R, G, B) is applied, a variable-gain amplifier circuit (white-balance adjusting circuit) and a process matrix circuit. A luminance signal Y (on which a synchronizing signal S is superimposed) and two color difference signals R-Y and B-Y are formed within the process matrix circuit. These color difference signals R-Y and B-Y are line-sequenced every 1H by a line sequencing circuit 72. The luminance signal Y and the line-sequenced color difference signal are delivered through pre-emphasis circuits (not shown) and are then applied to the frequency modulator circuits 73 and 74, where the signals are frequency modulated at respective frequency bands which differ from each other. The resulting frequency-modulated signals are combined in a mixing circuit 75.

It is possible for additional information to be recorded on tracks of the floppy disk 1. The additional information above refers to an audio signal (which represents a voice for narration, music, etc.) and a display signal (which represents, for example, character information). This additional information signal enters the signal processing circuit 71 from a microphone or other input device, not shown, to be converted into a predetermined format before being delivered to the line for the luminance signal Y. There are also cases where the additional information signal is superimposed on the luminance signal Y. In a case where only the additional information signal is recorded on a predetermined track of the video floppy 1, this signal alone will be outputted.

In addition, it is possible to perform multiplexed recording of ID data on the video floppy 1. The multiplexed ID data includes an initial bit, field/frame data representing the field or frame recording, track No. data, data data, and user data. These data items are provided from the system controller 10, are modulated in the differential phase shift keying (DPSK) system by the signal processing circuit 71, and are then combined with the above frequency-modulated video signal in the mixing circuit 76 such that the resultant signal is supplied to a recording amplifier circuit 77.

The magnetic head 2 (two of which are provided at a spacing with positions associated with mutually adjacent tracks so as to enable the frame recording) is disposed to write the still video signal of the imaged subject on a predetermined track of the video floppy 1 and is supported to be diametrically over the video floppy 1 so as to be controlled for a travel thereof in the same direction by a feed drive controller thereof. The feed drive controller includes a stepping motor 87 and a driver 86. The recording controller 70 provides the feed drive controller with instructions related to the feeding direction and the amount of feed of the magnetic head 2. There is also disposed a home position switch 6 for detecting that the magnetic head 2 has arrived at the home position HP such that the detection signal from this switch 6 is delivered to the recording controller 70.

A head loading device is provided to prevent the floppy disk 1 from becoming scarred due to a prolonged contact between the magnetic head 2 and the magnetic disk 1 when the magnetic disk is at rest. Under the control of the recording controller 70, the head loading device including a head loading solenoid 85 and a driver 84 thereof displaces (advances and retracts) the magnetic head 2 in such a manner that the magnetic head 2 is brought into contact with the video floppy 1 only in a recording or playback (when the video floppy 1 is rotating) or only when power is being supplied, and separates the video floppy 1 in other cases.

To provide a good contact between the magnetic head 2 and the rotating video floppy 1, a regulating plate, not shown, is disposed on a side of the video floppy 1 opposite to the magnetic head 2. Disposed adjacent to the core of the video floppy 1 is a phase detector 5 which, by detecting the leakage flux from a permanent magnet for chucking purposes, senses when the video floppy 1 has arrived at a predetermined angular position, whereupon the detector 5 outputs a phase detection signal. The output detection signal of the phase detector 5 is fed to a phase pulse generating circuit (waveform shaping circuit) 82, which in turn shapes the waveform of the received signal so as to output the resultant signal as the phase pulse PG, which is applied to the controllers 10, 70, and 90, the circuit 71, and the recording gate circuit 78 as described above. A phase pulse PG is produced each time the video floppy 1 makes a revolution.

The disk motor 3 is driven by the driver 81 thereof. The rotational speed of the disk motor 3 is detected by a frequency generator 4, which outputs a detection signal whose frequency is proportional to the rotational speed of the motor 3. The signal enters the servo-control circuit 80. Based on the reference clock signal supplied from the signal processing circuit 71 and the frequency detection signal received from the detector 4, the servo-control circuit 80 controls the motor 3 so as to set the motor 3 to a constant speed (e.g. 3600 rpm). The servo-control circuit 80 also starts and stops the motor 3 in accordance with a command from the recording controller 70.

The still video signal and other signals amplified by the recording amplifier circuit 77 are supplied to the recording gate circuit 78. When a record command is issued from the recording controller 70, if the operation is effected in the field recording mode, the gate circuit 78 is opened at the timing of the phase pulse PG applied thereto and remains open until the next phase pulse PG enters. As a result, the video signal and the like are supplied to the magnetic head 2 so as to record a still video signal, etc. on a predetermined track of the video floppy 1. This recording is conducted only during a rotation of the video floppy 1. In the frame recording mode, the gate circuit 78 opens the gate for two revolutions of the video floppy 1 such that a video signal of a first field is recorded on a certain track by one head 2 in the first revolution of the video floppy 1, and a video signal of a second field is recorded on a track adjacent thereto by the other head 2 in the second revolution of the video floppy 1.

It is also possible for the magnetic head 2 to reproduce a video signal and the like from the video floppy 1. A frequency-modulated video signal, etc. read from the magnetic head 2 are similarly amplified by the amplifier circuit 77 via the gate circuit 78 and are then applied to an envelope detector circuit 83 and the playback device 90. This playback signal is employed in track search processing in the recording mode as well as in the playback mode.

The envelope detector circuit 89 detects the envelope of the read signal from the magnetic head 2, namely, the envelope of the frequency-modulated video signal recorded on a track of the video floppy 1 so as to output a voltage signal corresponding to the detected envelope. The circuit 89 includes an analog-to-digital (A/D) converter, which converts the voltage signal representing the envelope into a digital quantity, for example, an 8-bit digital signal representing 256 quantization levels so as to be supplied to the recording controller 70.

The envelope detection signal is used so that the recording controller 70 may determine whether a video track on the video floppy 1 has blank or is already undergone a recording (this is referred to as track search processing). If the level of the detection signal does not reach a predetermined threshold when the magnetic head 2 is fed across a track, the track is assumed to be blank. Whereas, if the threshold level is reached, the track has already undergone a recording.

If necessary, the envelope detection signal may also be used in recording check processing. The recording check processing refers to a check for determining whether or not a recording has actually been achieved after an imaged still video signal is recorded on a predetermined track by the magnetic head 2 in the manner described above. A decision is rendered to the effect that a recording has been conducted when the envelope detection signal is not less than the predetermined threshold level.

The envelope detection signal is also employed to detect a center position (a peak position of an envelope detection signal) of a signal recorded on a track to be subjected to a playback in the playback mode. The peak position detect processing is effected such that the magnetic head 2 is fed across a track to be reproduced so as to detect a position where an envelope detection signal indicates a peak, thereby locating the magnetic head at the peak position.

The still video camera further includes a power supply circuit 110 which is provided with a main power supply (battery) 111 and an auxiliary power supply (battery) 112. The main power source 111 supplies an operation power to all electric constituent elements, whereas the auxiliary power source 112 supplies an operation power to the main CPU of the system controller 10 when the main power source 111 is off (that is, a main power control switch 113 is off). In this situation, the main CPU is in the standby mode. In consequence, the main power supply 111 and the auxiliary power supply 112 are connected in parallel with respect to the system controller 10. The main power supply 111 has an output side connected to the main power control switch 113. The switch 113 is turned on if the switch 113 is in the off state when a switch signal is supplied thereto from a power switch 16 or a power switch 96 of the playback device 90 so as to supply the power to the respective components of the still video camera. Furthermore, the system controller 10 is powered via a voltage regulating circuit 114, and the main power supply 111 supplies the power to the playback device 90 if the device 90 is connected. In addition, when the switch 113 is on, if the power switch 16 or the power switch 96 is depressed so as to supply a switch signal to the system controller 10, the switch 113 is turned off by the system controller 10 so as to interrupt the supply from the main power source 111 to the still video camera and the playback device 90. Moreover, if the switch operation is not carried out in the camera or the playback device 90 for a predetermined period of time, the system controller 10 effects an auto power off operation to turn the main power control switch 113 off.

The playback device 90 is detachably mounted on the body of the still video camera. When the playback device 90 is attached onto the still video camera, a power supply line from the main power source 111, and the auxiliary power source 112, a playback video signal line from the recording amplifier circuit 77, a line of the phase pulse PG, and a serial transmission line are connected to the associated lines on the side of the playback device 90 by a connector, not shown. Moreover, a switch signal line of the power switch 96 of the playback device 90 is connected to the corresponding line of the power switch 16.

Power supplied from the power supply line of the video camera is fed via the voltage regulating circuit 98 to a sub-CPU 91 in the playback device 90 and is delivered via the main power control switch 97 to other electric constituent elements in the playback device 90. The playback device 90 is also provided with a power switch 96 of a push-button type. A pulse-shaped switch signal from the power switch 96 is fed as an interruption signal to the sub-CPU 91 and is supplied as an interruption signal to the main CPU of the system controller 10 of the still video camera. That is, the two power switches 16 and 96 are connected in parallel with respect to the system controller 10 when the playback device 90 is mounted on the camera.

The main CPU of the system controller 10 is in the standby mode when the main power control switch 113 is turned off as described above. However, when an interruption signal is received from the power switch, the main CPU is activated to turn the switch 113 on. In addition, to determine whether the power switch interruption is conducted by the power switch 16 or 96, the main CPU communicates with the sub-CPU 91 of the playback device 90. In a case where the power switch 96 is depressed, the switch interruption thereof is also supplied to the sub-CPU 91. In consequence, when an inquiry related to the power switch is received from the main CPU, if there exists an interruption from the switch 96, the sub-CPU 91 notifies the main CPU that the interruption is caused by the switch 96. In this case, the playback device 90 has already been mounted on the camera. The still video camera is ordinarily in a recording mode (including the skip mode and the edit mode above) and is set to the playback mode when a depression of the power switch 96 is recognized. On the other hand, the sub-CPU 91 of the playback device 90 is in the standby state when the main power supply is off and is initiated by an interruption signal from the power switch 96 so as to turn the main power control switch 97 on, thereby starting the operation of the playback device 90.

Incidentally, there may be separately disposed a switch for setting the playback mode.

If the playback device 90 is not mounted on the camera, the reply is not made in response to the inquiry issued from the main CPU. Even when the playback device 90 is mounted on the camera, if the power switch 96 is not depressed, the sub-CPU 91 notifies in response to the inquiry that the power switch 96 is not depressed. Based on this information, the main CPU of the system controller 10 recognizes that the power switch 16 has been depressed and retains the recording mode.

The playback device 90 is further provided with a processing circuit 99 for a still video signal inputted from the playback still video signal line of the still video camera. The processing circuit 99 includes a separator circuit for separating the luminance signal component, the color difference signal component, etc., a field/frame converter circuit, a frequency demodulator circuit, a coincidence circuit, a DPSK demodulator circuit for ID data, and the like, so that the reproduced still video signal undergoes processing in this circuit 99 so as to be outputted as a video signal of the NTSC format. Furthermore, this circuit 99 outputs the additional information signal, data signal, etc.

The playback device 90 is further provided with a forward feed switch 92 for inputting an instruction to feed the magnetic head 2 in the forward direction by a track, a backward feed switch 93 for inputting an instruction to feed the magnetic head 2 in the backward direction by a track, an erase switch 94 for inputting an instruction to erase the signal recorded on the video floppy 1, and a track No. specify switch 95 for specifying a track No. over which the magnetic head 2 is to be located. The playback device 90 communicates with the system controller 10 so as to deliver the instructions from these switches to the controller 10, which in turn communicates with the recording controller 70 so as to send the instructions to the recording controller 70, which thereby conducts the operations associated with the instructions.

Next, a description will be given of processing related to the track information. There are effected two kinds of processing, namely, processing in which the playback device 90 saves track information detected in association with the playback processing (track information table generate processing by the playback device) and processing in which the still video camera saves track information utilized in a recording operation so as to later use the saved information in a playback processing of the playback device 90 (track information table generate processing by the camera). For easy understanding, first, the processing is separately described, and then a description will be given of a shared usage of the track information tables thus produced.

First, a description will be given of the track information table generate processing by the playback device. FIG. 2 shows an example of the track information table produced in this processing. The table is disposed to store therein, for each track No. of the video floppy 1, record presence/absence data indicating whether or not a signal is recorded on the track, playback indicate data indicating whether or not a playback is already effected on the track, the field/frame data indicating whether the track has undergone the field or frame recording, and peak position data indicating a peak position of an envelope of the signal read from the track. Since the presence or absence of the recording of data can be known from other data, the recording presence/absence data need not be necessarily disposed. The playback indication is also known from other data, the playback indicate data may be omitted. The field/frame data is obtained by demodulating the ID data in the processing circuit 99. For example, in a case of the field recording, 00 is employed as this data item. In a case of the frame recording, a scene of image data is recorded in two tracks such that as the field/frame data, for example, data 01 is employed in the outer track of the two tracks and data 10 is assigned to the inner track thereof. If it is assumed that the operation is achieved in the field recording, when the field/frame data is other than 01 or 10, or when the data is missing, the field data need not be necessarily disposed. The peak position data is attained through the peak position detect processing. The peak position is expressed by a distance from the home position HP, namely, with a number of pulses to be supplied to the stepping motor 86 when the magnetic head 2 is moved from the home position HP to the peak position of the pertinent track.

Such a track information table is generated in a playback operation of the playback device 90 so as to be stored in the memory of the playback device 90. Moreover, when the power of the playback device 90 or the still video camera is turned off, the table is transferred from the playback device 90 via a serial transmission line to the system controller 10 so as to be stored in a memory thereof. Thereafter, when the power is turned on and the playback mode is set again, the table is transmitted from the system controller 10 to the playback device 90 and is then stored in the memory thereof. In the playback device 90, when a track having already undergone a playback is specified for a playback, the track information related to the track can be employed for the playback operation. In consequence, it becomes unnecessary to effect the demodulate processing of the ID data and the peak position detect processing, and hence the playback processing can be achieved at a high speed.

The track information table above varies between video floppy disks and is significant only for the video floppy installed in the bucket. Consequently, when the video floppy is removed from the bucket, the track information tables stored in the system controller 10 and the playback device 90 are cleared. That the video floppy is taken out from the bucket can be detected depending on at least either one of a signal from the bucket switch 7 or a signal received from a switch detecting whether or not the bucket is loaded with a video floppy. Also in a case where the main power is off and the main CPU is in the standby state, it is desirable to once initiate the main CPU by use of a signal from either one of these switches so as to store the pertinent condition or to clear the track information tables. In the former case, when the main power is turned on, if there exists information notifying that the video floppy is already removed, the track information table is cleared. Alternatively, it may also be achieved that, for example, the open state of the bucket is mechanically memorized such that when the main power is turned on and the main CPU is then initiated, the track information table is cleared.

Figure 3:
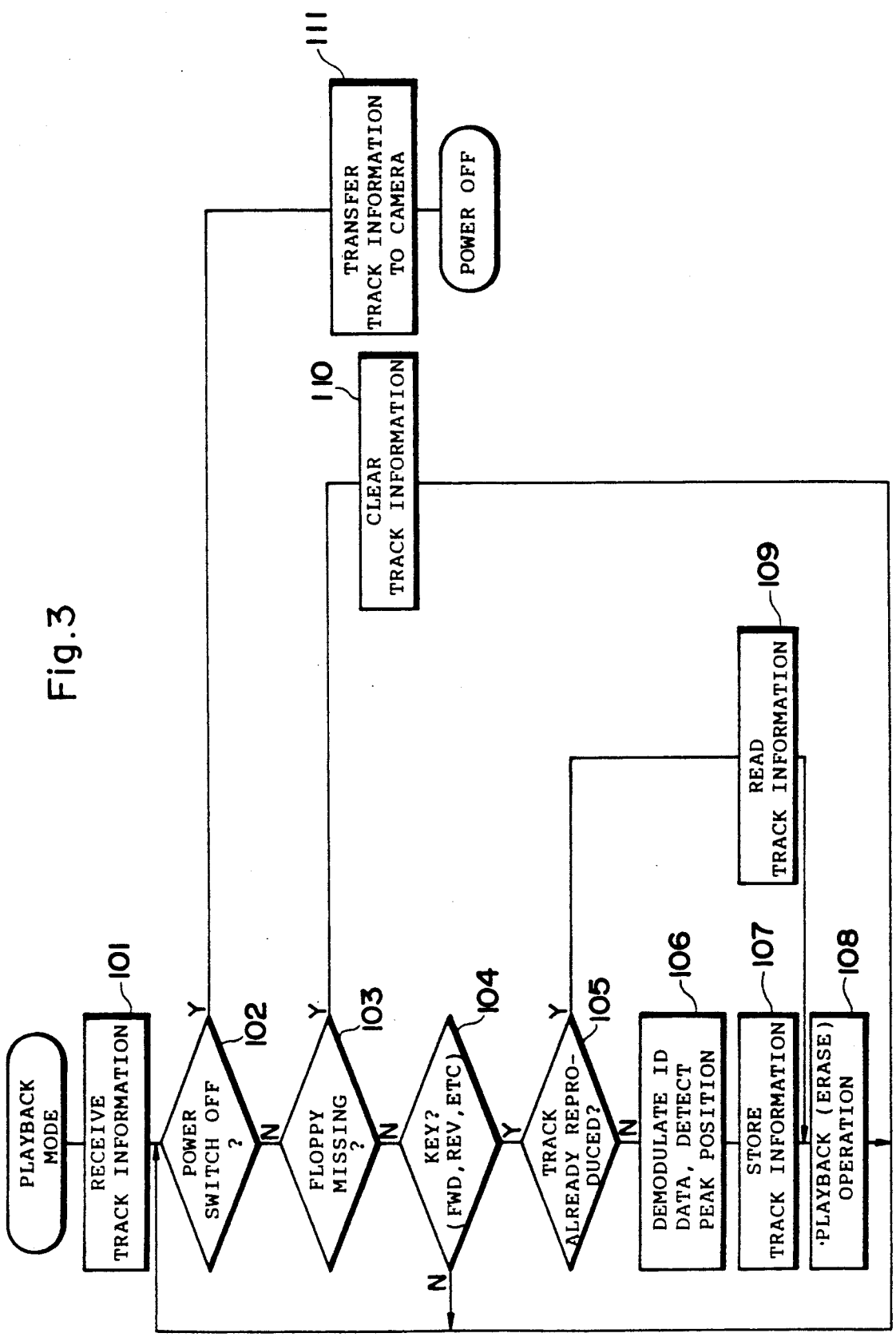
FIG. 3 is a flowchart showing a procedure of the table generate processing.

FIG. 3 shows processing effected in the playback device 90 above.

When the playback mode is set through a depression of the power switch 96 or by use of a particular playback mode switch, the main CPU of the system controller 10 sends data of the track information table if the table is beforehand stored in the memory to the playback device 90, and then the sub-CPU of the playback device 90 stores the track information table in the memory thereof (step 101).

When the forward feed switch 92, the backward feed switch 93, the track No. specify switch 95, or the like is operated to specify a playback objective track for a playback operation (step 104), the track information table stored in the memory of the playback device 90 is referenced so as to determine whether or not the playback objective track is already subjected to a playback operation (step 105). If the track has been previously reproduced, the field/frame data and the peak position data have already been set to the table. In consequence, these data items are read out therefrom to achieve a playback processing (erase processing if the erase mode is specified at steps 109 and 108). The field/frame data is employed to control operations such as a field/frame change-over circuit in the processing circuit 99 on the side of the playback device 90. In addition, on the side of the camera, these data items are used to control an operation to feed the magnetic head 2 and the operation of the recording gate circuit 78. The data items read from the table may be sent from the playback device 90 to the system controller 10, or the system controller 10 may read the data from the table stored in the memory thereof.

In a case where the track specified as an object of the playback operation has not previously undergone a playback processing, communications are effected between the playback device 90 and the system controller 10 such that the peak position detect processing is achieved on the side of the camera so as to send data indicating the peak position to the playback device 90. On the other hand, in the processing circuit 99 of the playback device 90, the DPSK demodulate processing is conducted on the ID data to extract the field/frame data therefrom (step 106). These data items are stored in the track information table of the playback device 90 (step 107). Thereafter, a playback operation (or an erase operation) is carried out (step 108).

In the playback processing above, when a state that the floppy disk is removed is notified from the main CPU (step 103), the track information table is cleared in the memory as described above.

Furthermore, when the power switch 96 is depressed again (step 102) or immediately before the power is turned off through the auto power off processing, the track information table is transmitted from the memory of the playback device 90 to the system controller 10 so as to be stored in the memory thereof (step 111). Thereafter, the switch 97 is turned off so as to set the sub-CPU 91 of the playback device 90 to the standby state. It may also be possible that the switch 113 is turned off and also the main CPU of the camera is set to the standby state. Similarly, when the power switch 16 is depressed, the track information table is transmitted to the side of the camera.

Next, a description will be given of the track information table generate processing in the camera. FIG. 4 shows an example of the track information table generated in the processing. In the table, there are recorded, for each track number of the video floppy, recording presence/absence data indicating whether or not a signal has been recorded in the track, and field/frame data indicating whether the track undergoes the field or frame recording. The recording presence/absence data may be produced through a track search processing. This recording presence/absence data may be omitted. The field/frame data is determined by the field or frame mode set in the still video camera.

The track information table above is produced by the system controller 10 when a recording operation is conducted in the still video camera so as to be stored in the memory thereof. When the playback mode is thereafter set, the table is transmitted to the playback device 90 and is then loaded in the memory thereof. In the playback device, by referencing the received track information table, it can be recognized whether the playback objective track is associated with the field or frame recording. Consequently, the playback processing can be accomplished without effecting the demodulate processing of the ID data.

FIG. 5 shows a processing procedure executed by the system controller 10. When the power switch is turned on and the recording mode is set, in a recording operation of an imaged video signal effected on the video floppy 1 (step 124), the track information above is recorded in the track information table corresponding to the recording objective track (step 125).

When the playback device 90 is mounted on the camera and is then set to the playback mode as described above (step 122), the track information table stored in the memory is sent from the system controller 10 to the playback device 90 and is stored in the memory (step 128). In the playback device 90, the playback operation can be achieved at a high speed by use of the track information table as described above.

In a case where the video floppy being removed is detected or is beforehand memorized (step 123), the track information table is cleared in the memory of the system controller 10 (step 126) and then the pertinent state is notified to the playback device (step 127). On receiving the report, the playback device 90 also clears the track information in the memory thereof.

When the power switch 16 is depressed (step 121), the switch 113 is turned off and the main CPU is set to the standby state.

The track information table generate processing has been separately described for the playback device and the camera. However, the track information table may be shared therebetween. In this embodiment, the track information table generated in the track information table generate processing effected in the playback device is larger in the number of track information items than the table generated in the camera, and hence the table of FIG. 2 will be employed as the common table.

In the recording mode, the table is produced or rewritten (step 125 of FIG. 5) by the system controller 10 on the side of the camera as described above. When the playback mode is set thereafter, the new table is transferred to the playback device 90 so that the table is loaded in the memory thereof or a portion of the table is rewritten in the memory thereof (step 128 of FIG. 5 and step 101 of FIG. 3). In a playback operation, new track information items (the playback completion data, the peak position data, etc.) are added to this table (steps 106 and 107 of FIG. 3). Alternatively, the playback operation is executed by use of the track information of this table (in this case, the track information may be utilized even if the track is not beforehand subjected to a playback operation at steps 109 and 108 of FIG. 3). When the power is turned off, the data of the track information table thus updated is transferred to the system controller 10 of the camera (step 111 of FIG. 3) such that the table of the controller 10 is updated by use of the transferred data.

On the side of the camera, when an event such as a removal of the video floppy, a replacement thereof, or an installation thereof is detected (step 123 of FIG. 5), the table on the camera side is cleared (step 126 of FIG. 5) and the condition is notified to the playback device 90 (step 127 of FIG. 127). In consequence, on receiving the report, the playback device 90 also effects a clear processing of the track information table (steps 103 and 110 in FIG. 3).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of an operation in a still video camera system having a still video camera comprising the steps of:

producing a still video signal representing an objective image by a solid-state imaging element of the still video camera;

recording said still video signal on a predetermined track or in two predetermined tracks of a rotating magnetic recording medium having a plurality of tracks;

reproducing a signal read from the predetermined track or the two predetermined tracks of the magnetic recording medium by a playback device capable of being detachably connected to the still video camera;

processing by the playback device said signal read from the predetermined track or the two predetermined tracks from the magnetic recording medium sent from the still video camera;

storing track information detected in association with a playback processing in a playback memory thereof corresponding to a track number;

controlling said playback processing by designating one of said plurality of tracks to be played back and accessing said one track designated; and transferring said track information stored in said playback memory from the playback device to the still video camera when a main power off operation is conducted in either one of the still video camera and the playback device and storing the track information in a still video camera memory of the still video camera.

2. A method of an operation according to claim 1 further comprising the steps of:

storing track information used in a recording operation in said still video camera memory of the still video camera; and transferring the track information stored in said still video camera from memory of the still video camera to the playback device when the playback device is connected to the still video camera and a mode thereof is changed over to a playback mode and storing the track information in said playback memory of the playback device.

3. A method of an operation in a still video camera system having a still video camera comprising the steps of:

producing a still video signal representing an objective image by a solid-state imaging element of the still video camera;

recording said still video signal on a predetermined track or in two predetermined tracks of a rotating magnetic recording medium having a plurality of tracks;

reproducing a signal read from the predetermined track or the two predetermined tracks of the magnetic recording medium by a playback device capable of being detachably connected to the still video camera;

storing track information used in a recording operation in a still video camera memory of the still video camera; and transferring said track information stored in said still video camera memory from the still video camera to the playback device when the playback is connected to the still video camera and a mode thereof is changed over to a playback mode and storing the track information in a playback memory of the playback device.

4. A still video camera system comprising:

a still video camera for producing a still video signal representing an objective image by a solid-state imaging element and recording said still video signal on a predetermined track or in two predetermined tracks of a rotating magnetic recording medium having a plurality of tracks;

a playback device capable of being detachably connected to said still video camera for reproducing a signal read from said predetermined track or said two predetermined tracks of said magnetic recording medium;

playback processing means for signal processing in said playback device said signal read from said predetermined track or said two predetermined tracks from said magnetic recording medium sent by said still video camera;

a playback memory for storing track information corresponding to a track number detected in association with a playback processing of said playback device;

playback control means for controlling said playback processing by designating one of said plurality of tracks to be played back and accessing said one track designated;

transferring means for transferring said track information stored in said playback memory from said playback device to said still video camera when a main power off operation is conducted in either one of said still video camera and said playback device; and a still video camera memory of said still video camera for storing said track information transferred by said transferring means.

5. A still video camera system according to claim 4, wherein said still video camera stored track information used in a recording operation in said still video camera memory of said still video camera and said transferring means transfers said track information stored in said still video camera memory from said still video camera to said playback device when said playback device is connected to said still video camera and a mode thereof is changed over to a playback mode.

6. A still video camera system comprising:

a still video camera for producing a still video signal representing an objective image by a solid-state imaging element and recording said still video signal on a predetermined track or in two predetermined tracks of a rotating magnetic recording medium having a plurality of tracks;

a playback device capable of being detachably connected to said still video camera for reproducing a signal read from said predetermined track or said two predetermined tracks of said magnetic recording medium;

a still video camera memory for storing track information used by a recording operation in said still video camera;

transferring means for transferring said track information stored in said still video camera memory from said still video camera to said playback device when said playback device is connected to said still video camera and a mode thereof is changed over to a playback mode; and a playback memory of said playback device for storing said track information transferred by said transferring means.

* * * * *